United States Patent
Litzenberg et al.

(10) Patent No.: US 8,100,688 B2
(45) Date of Patent: Jan. 24, 2012

(54) DEVICE FOR BLOW MOLDING CONTAINERS

(75) Inventors: Michael Litzenberg, Geesthacht (DE); Michael Linke, Hamburg (DE); Rolf Baumgarte, Ahrenburg (DE); Frank Lewin, Tangstedt (DE)

(73) Assignee: KHS Corpoplast GmbH & Co. KG, Hamburg (DE)

( * ) Notice: Subject to any disclaimer, the term of this patent is extended or adjusted under 35 U.S.C. 154(b) by 146 days.

(21) Appl. No.: 12/450,128

(22) PCT Filed: Apr. 10, 2008

(86) PCT No.: PCT/DE2008/000622
§ 371 (c)(1),
(2), (4) Date: Mar. 3, 2010

(87) PCT Pub. No.: WO2008/138293
PCT Pub. Date: Nov. 20, 2008

(65) Prior Publication Data
US 2010/0203185 A1    Aug. 12, 2010

(30) Foreign Application Priority Data
May 15, 2007 (DE) .......................... 10 2007 022 638

(51) Int. Cl.
*B29C 49/56* (2006.01)
(52) U.S. Cl. ................. 425/540; 425/451.4; 425/DIG. 5
(58) Field of Classification Search ................. 425/532, 425/538, 540, 541, 451.4, DIG. 5; B29C 49/56
See application file for complete search history.

(56) References Cited

U.S. PATENT DOCUMENTS

| 3,843,286 A | 10/1974 | Horberg et al. |
| 3,856,450 A | 12/1974 | Britten |
| 4,233,010 A * | 11/1980 | Suzuki .......................... 425/143 |
| 6,390,802 B1 * | 5/2002 | Zoppas .......................... 425/540 |
| 6,929,462 B1 | 8/2005 | Andrews |
| 7,871,259 B2 * | 1/2011 | Linke et al. ................... 425/526 |
| 2004/0156943 A1 | 8/2004 | Lefebure |

FOREIGN PATENT DOCUMENTS

| DE | 19807582 | 8/1999 |
| DE | 10212896 | 10/2003 |

(Continued)

*Primary Examiner* — Robert B Davis
(74) *Attorney, Agent, or Firm* — Lucas & Mercanti, LLP; Klaus P. Stoffel

(57) ABSTRACT

The invention relates to a device for blow molding containers. The temperature of parisons, which are made of a thermoplastic material, is adjusted and the parisons are then molded in a blow mold under the effect of a pressurized medium to give containers. The blow mold which is composed of at least two blow mold segments is held in place by mold supports of a blow molding station (3) that is arranged on a supporting structure (41). A bottom part (7) is used in addition to the blow mold segments. Both the mold supports and the bottom part are arranged in such a way that they can be mechanically positioned. The mold supports and the bottom part are mechanically coupled to each other. One of the mold supports (19) is immobile and the other mold support is swiveled to the supporting structure. The bottom part has a trajectory relative to the mold support which has a component that extends in the longitudinal direction of the blow molding station and a component that extends at a right angle to the longitudinal direction.

11 Claims, 8 Drawing Sheets

FOREIGN PATENT DOCUMENTS

| | | |
|---|---|---|
| DE | 102004045405 | 4/2006 |
| DE | 60308207 | 8/2007 |
| EP | 1520681 A1 * | 4/2005 |
| FR | 2841495 | 1/2004 |
| WO | 2006/010706 | 2/2006 |
| WO | 2006/029585 | 3/2006 |
| WO | 2007/012309 | 2/2007 |

* cited by examiner

DEVICE FOR BLOW MOLDING CONTAINERS

The invention concerns a device for blow molding containers, which has at least one blowing station mounted on a support structure for blow molding thermoplastic preforms into containers; in which the blowing station is provided with at least two blow mold segments mold that are supported by mold supports and with a base part; and in which both the mold supports and the base part are arranged in a way that allows them to be mechanically positioned, and the mold supports and the base part are mechanically coupled with one another.

In this type of container molding by the action of blowing pressure, preforms made of thermoplastic material, for example, preforms made of PET (polyethylene terephthalate), are fed to different processing stations within a blow-molding machine. A blow-molding machine of this type typically has a heating system and a blowing system, in which the preform, which has first been brought to a desired temperature, is expanded by biaxial orientation to form a container. The expansion is effected by means of compressed air, which is fed into the preform to be expanded. DE-OS 43 40 291 explains the process-engineering sequence in this type of expansion of the preform.

The basic structure of a blowing station for container molding is described in DE-OS 42 12 583. Possible means of bringing the preform to the desired temperature are explained in DE-OS 23 52 926.

Various handling devices can be used to convey the preforms and the blow-molded containers within the blow-molding device. The use of transport mandrels, onto which the preforms are slipped, has proven especially effective. However, the preforms can also be handled with other supporting devices. Other available designs involve the use of gripping tongs for handling the preforms and the use of expanding mandrels, which can be inserted in the mouth region of the preform to support the preform.

The handling of containers with the use of transfer wheels is described, for example, in DE-OS 199 06 438 with the transfer wheel arranged between a blowing wheel and a delivery line.

The above-explained handling of the preforms occurs, for one thing, in so-called two-step processes, in which the preforms are first produced by injection molding and temporarily stored and then later conditioned with respect to their temperature and blown into containers. For another, the preforms can be handled in so-called one-step processes, in which the preforms are first produced by injection molding and allowed to solidify sufficiently and are then immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be displaced relative to each other or that are guided in a different way. In stationary blowing stations, which are suitable especially for accommodating several cavities for container molding, plates arranged parallel to one another are typically used as mold supports.

Opening and closing movements of the blowing station and lifting movements of the base part are typically carried out by mechanical control means. In the case of blowing stations that are mounted on rotating transport wheels, cam segments that are mounted in a stationary way on the machine frame are used. Cam followers are guided along the cam segments and are connected with the components to be moved. The cam segments are usually arranged only along those parts of the blowing wheel along which a change in the positioning of the associated cam followers is provided. In the given end position that is provided, the cam followers are then stabilized by suitable means.

The objective of the present invention is to improve a device of the aforementioned type in a way that allows compact construction.

In accordance with the invention, this objective is achieved by virtue of the fact that one of the mold supports is mounted by the support structure in an immovable way, while the other mold support is mounted by the support structure in a way that allows it to swivel, that the base part is mounted in a way that allows it to move relative to each of the two mold supports, and that the base part has a path of motion relative to the mold supports that has both a component that extends in the longitudinal direction of the blowing station and a component that extends perpendicularly to the longitudinal direction.

The design of the blowing station with a stationary mold support and a moving mold support allows an extremely compact arrangement of a plurality of blowing stations arranged next to one another. However, an arrangement of this type leads to the problem that a customary lifting movement of the base part relative to the mold supports cannot be carried out, since a positive-locking connection between the base part and the stationary mold support is usually realized. However, even if the base part can move freely relative to the mold support, there is the problem of a positive-locking connection between the blow-molded container and the blow mold, so that this also prevents a simple movement from being carried out.

The support of the base part in accordance with the invention and the mechanical coupling of the base part with the moving mold support make it possible to remove the blow-molded container from the blow mold in an extremely short amount of time and thus with small losses of available process time and in a way that is not mechanically complicated and at the same time has a high degree of precision of repetition of the movements to be carried out.

Due to the fact that the movement of the base part is carried out in the direction of the longitudinal axis of the blowing station, a possible positive-locking connection between a base contour of the blow-molded container and the contour of the base mold is broken. After the lateral positioning movement of the base part has been carried out, superimposed on the lifting movement of the base part, the blow-molded container is released from the blow mold in all three spatial dimensions and can be removed from the opened blowing station, for example, in the horizontal direction. The longitudinal axis of the blowing station typically extends in the vertical direction.

High precision in maintaining the movements to be carried out can be achieved by positioning the base part under cam control.

Simple predetermination of movement can be realized by coupling the base part with the movable mold support.

It is conducive to a compact design if the base part is mounted in such a way that it is able to rotate relative to a vertical axis.

It is also conducive to a compact design of the blowing station if the axis is an extension of a shaft of the blowing station.

Advantageous predetermination of movement can be realized if the base part has a cam follower that engages a cam track that extends essentially tangentially to a path of motion of the swiveling mold support.

In particular, extremely simple sequences of movement can be defined if the base part has a path of motion that is located within a segment of a cylindrical cam that is positioned essentially cylindrically to the shaft of the blowing station.

A mechanically robust coupling is obtained if the base part is connected with a drive shaft by a connecting rod and a positioning lever.

To make it easier for linear motions and motion components derived from rotational motions to be superimposed, it is proposed that ends of the connecting rod be flexibly connected with both the base part and the positioning lever.

A typical application consists in mounting the blowing station on a blowing wheel.

The removal of a positive-locking connection between a blow-molded container and the blow mold can be assisted especially if the base part can be positioned transversely to a parting plane fixed by the blow mold segments in a closed state of the blowing station.

Specific embodiments of the invention are illustrated in the accompanying schematic drawings.

Figure 1:
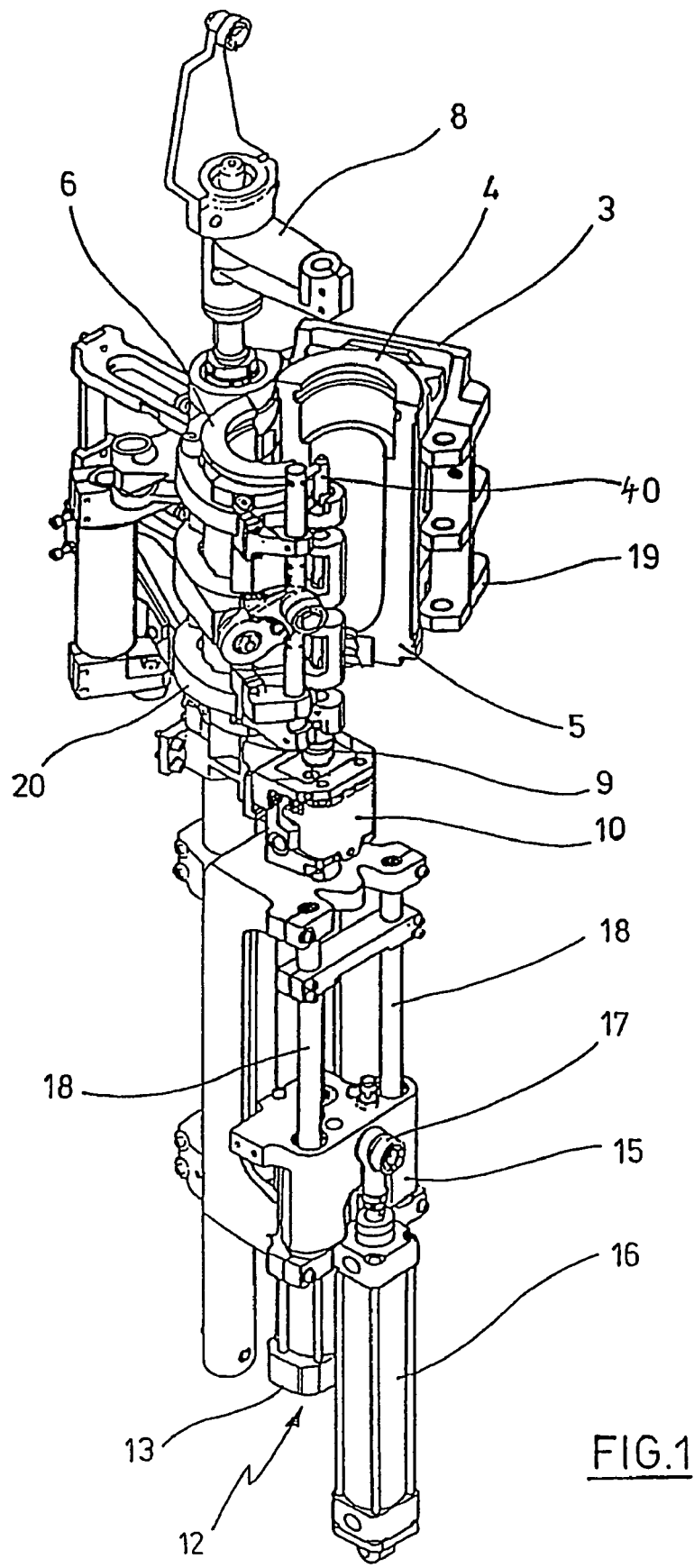
FIG. 1 shows a perspective view of a blowing station for producing containers from preforms.
Figure 2:
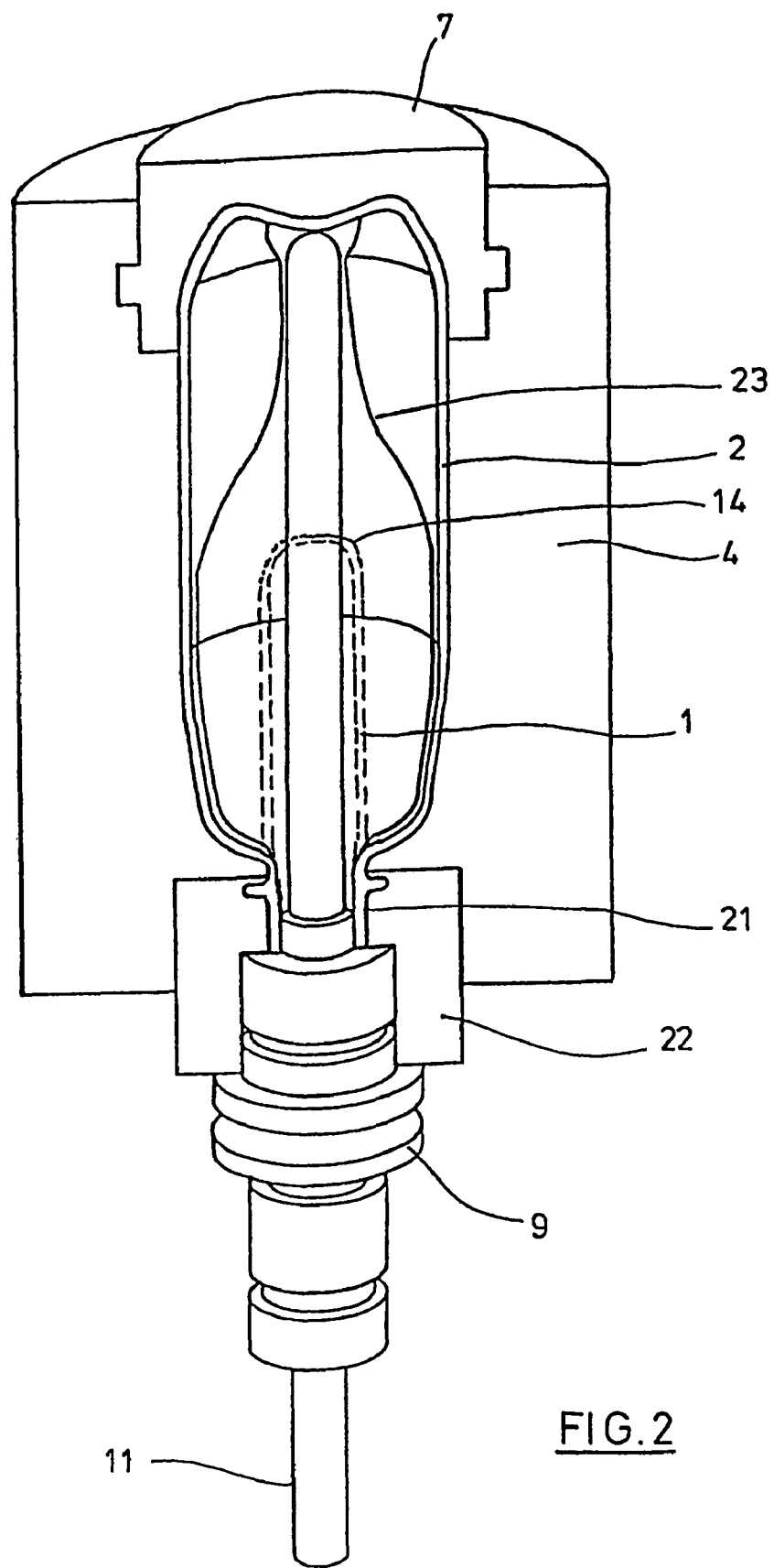
FIG. 2 shows a longitudinal section through a blow mold, in which a preform is stretched and expanded.

FIGS. 1 and 2 show the basic design of a device for shaping preforms 1 into containers 2.

The device for molding the container 2 consists essentially of a blowing station 3, which is provided with a blow mold 4, into which a preform 1 can be inserted. The preform 1 can be an injection-molded part made of polyethylene terephthalate. To allow a preform 1 to be inserted into the blow mold 4 and to allow the finished container 2 to be removed, the blow mold 4 consists of mold halves 5, 6 and a base part 7, which can be positioned by a lifting device 8. The preform 1 can be held in the area of the blowing station 3 by a transport mandrel 9, which, together with the preform 1, passes through a plurality of treatment stations within the device. However, it is also possible to insert the preform 1 directly into the blow mold 4, for example, with grippers or other handling devices.

To allow compressed air to be fed in, a connecting piston 10 is arranged below the transport mandrel 9. It supplies compressed air to the preform 1 and at the same time produces a seal relative to the transport mandrel 9. However, in a modified design, it is also basically possible to use stationary compressed air feed lines.

The preform 1 is stretched by means of a stretch rod 11, which is positioned by a cylinder 12. However, it is also conceivable for the stretch rod 11 to be mechanically positioned by cam segments, which are acted upon by pickup rollers. The use of cam segments is advantageous especially when a large number of blowing stations 3 is arranged on a rotating blowing wheel. The use of cylinders 12 is advantageous when stationary blowing stations 3 are provided.

In the embodiment illustrated in FIG. 1, the stretching system is designed in such a way that a tandem arrangement of two cylinders 12 is provided. Before the start of the actual stretching operation, the stretch rod 11 is first moved into the area of a base 14 of the preform 1 by a primary cylinder 13. During the stretching operation itself, the primary cylinder 13 with the stretch rod extended, together with a carriage 15 that carries the primary cylinder 13, is positioned by a secondary cylinder 16 or by a cam control mechanism. In particular, it is proposed that the secondary cylinder 16 be used in such a way under cam control that a current stretching position is predetermined by a guide roller 17, which slides along a cam track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking mechanism 40.

To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
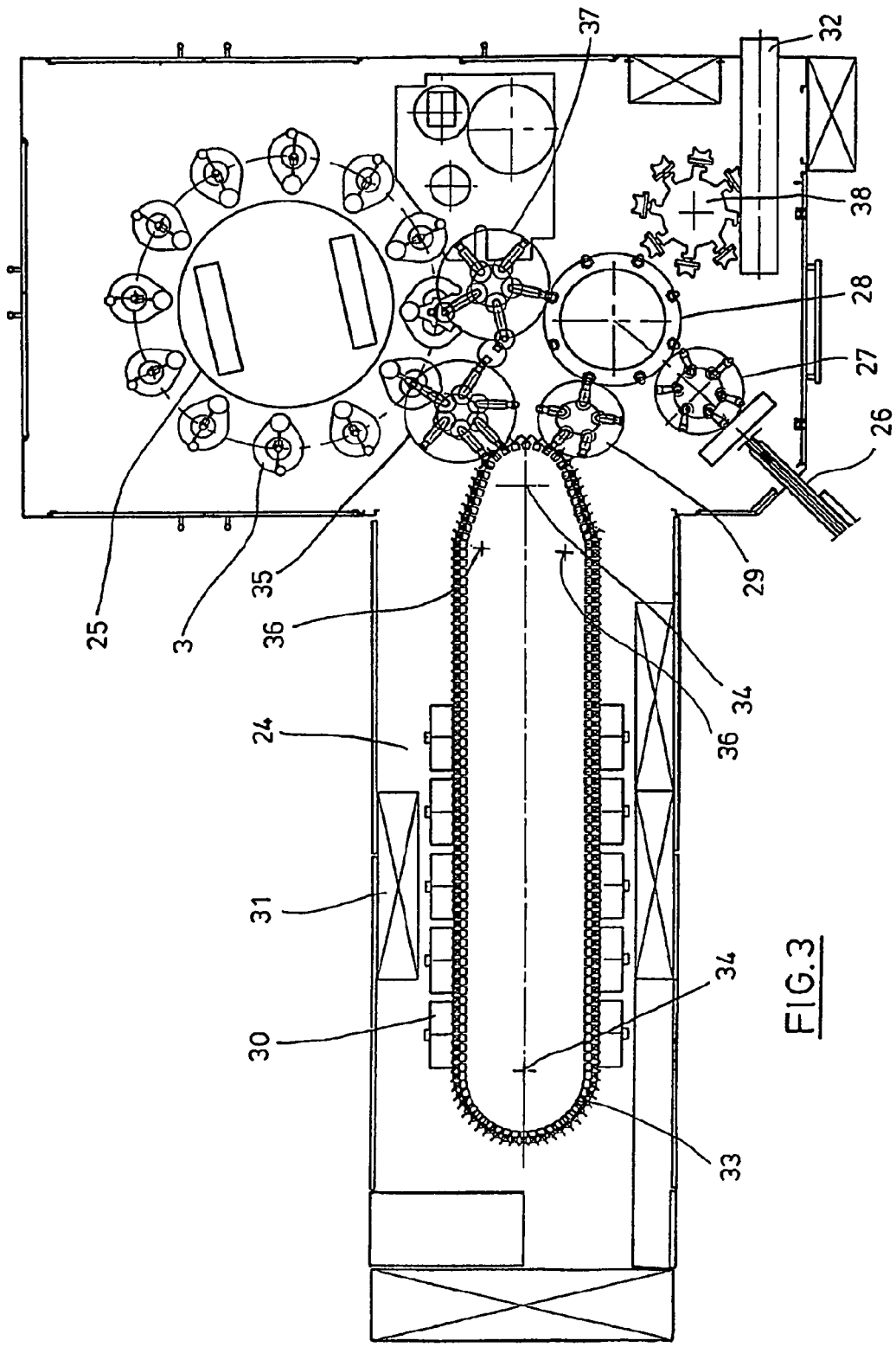
FIG. 3 is a drawing that illustrates a basic design of a device for blow molding containers.

FIG. 3 shows the basic design of a blow-molding machine, which has a heating line 24 and a rotating blowing wheel 25. Starting from a preform feeding device 26, the preforms 1 are conveyed to the area of the heating line 24 by transfer wheels 27, 28, 29. Radiant heaters 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by additional transfer wheels.

To make it possible for a preform 1 to be formed into a container 2 in such a way that the container 2 has material properties that ensure a long shelf life of the foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material, for example, PET, PEN, or PP.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10 bars to 25 bars is typically used, and during the main blowing phase, compressed air with a pressure in the range of 25 bars to 40 bars is supplied.

FIG. 3 also shows that in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the extension of the heating line 24 facing the transfer wheel 29 and a feed wheel 35, and two relatively small-sized guide wheels 36 are used in the area of adjacent deflections. In principle, however, any other types of guides are also conceivable.

To allow the closest possible arrangement of the transfer wheel 29 and the feed wheel 35 relative to each other, the illustrated arrangement is found to be especially effective, since three guide wheels 34, 36 are positioned in the area of the corresponding extension of the heating line 24, namely, the smaller guide wheels 36 in the area of the transition to the linear stretches of the heating line 24 and the larger guide wheel 34 in the immediate area of transfer to the transfer wheel 29 and to the feed wheel 35. As an alternative to the use of chain-like transport elements 33, it is also possible, for example, to use a rotating heating wheel.

After the blow molding of the containers 2 has been completed, the containers 2 are carried out of the area of the blowing stations 3 by an extraction wheel 37 and conveyed to the delivery line 32 by the transfer wheel 28 and a delivery wheel 38.

Figure 4:
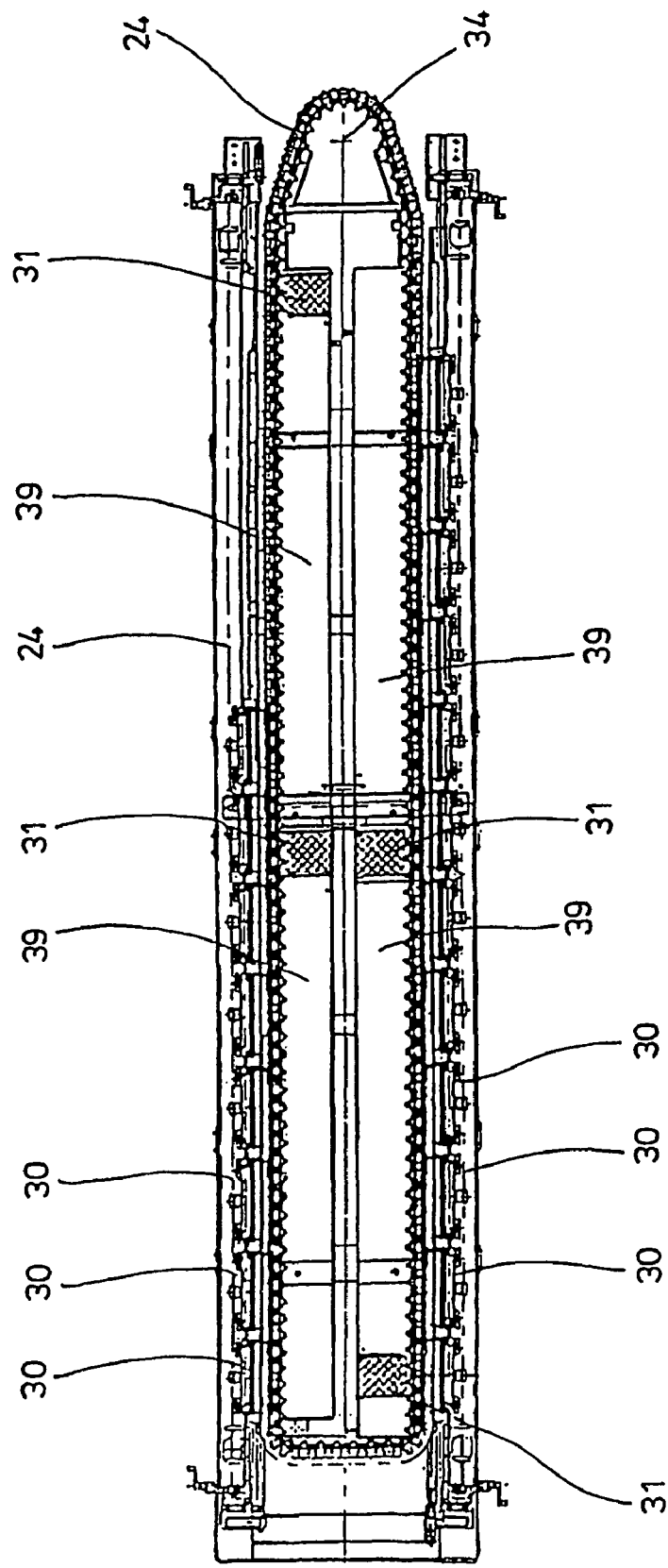
FIG. 4 shows a modified heating line with increased heating capacity.

In the modified heating line 24 illustrated in FIG. 4, a larger number of preforms 1 can be heated per unit time due to the larger number of radiant heaters 30. The fans 31 in this case feed cooling air into the area of cooling air ducts 39, which lie opposite the associated radiant heaters 30 and deliver the cooling air through discharge ports. A direction of flow of the cooling air essentially transverse to the direction of conveyance of the preforms 1 is realized by the arrangement of the discharge directions. In the area of surfaces opposite the radiant heaters 30, the cooling air ducts 39 can provide reflectors for the thermal radiation. It is also possible to realize cooling of the radiant heaters 30 by the delivered cooling air.

Figure 5:
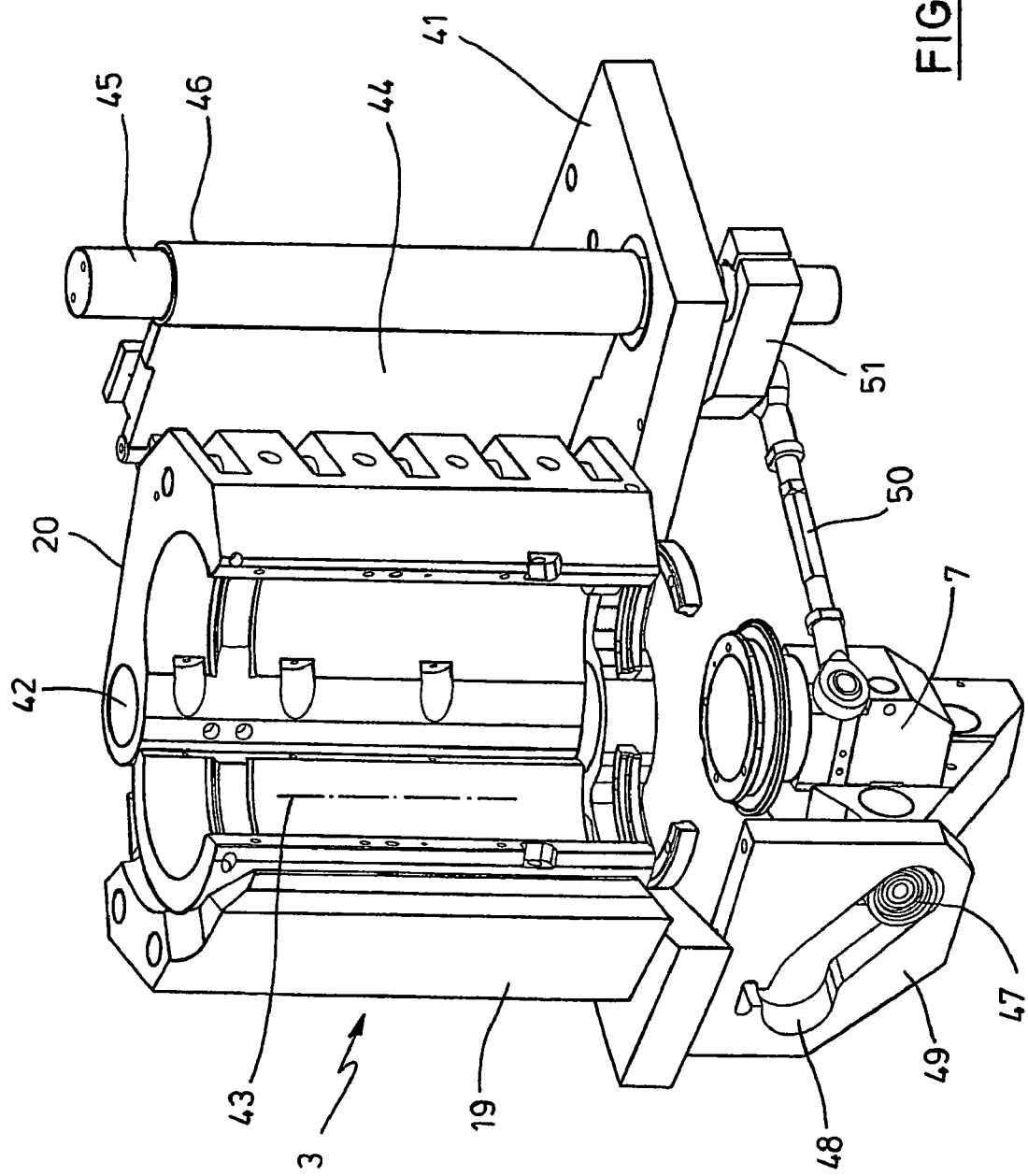
FIG. 5 shows a perspective view of a blowing station with a stationary mold support and a swiveling mold support and with a three-dimensionally positionable base part in a completely opened state of the blowing station.

FIG. 5 shows a perspective view of a blowing station 3, in which the mold support 19 is rigidly mounted by a support structure 41, and the mold support 20 is mounted by the support structure 41 in a way that allows it to swivel. In the illustrated embodiment, the base part 7 is located vertically below the mold supports 19, 20. In an arrangement of this type, the containers 2 are molded with their mouth sections 21 in the vertically upward direction.

The mold support 20 carries out a swiveling movement relative to a shaft 42 of the blowing station 3. The shaft 42 extends in the longitudinal direction of the blowing station 3. To preset the movements of the mold support 20, it is connected with a drive shaft 45 by a coupling lever 44. For example, the coupling lever 44 can enclose the drive shaft 45 with a sleeve 46, which is mounted on the drive shaft 45.

According to the specific embodiment in FIG. 5, the base part 7 is guided by a cam follower 47 in a cam track 48, which extends within a cam support 49. The cam support 49 is rigidly connected with the support structure 41. The cam track 48 has one component that extends in the longitudinal direction 43 of the blowing station 43 [sic-3] and one component that extends transversely to the longitudinal direction 43. In this regard, the cam track 48 is transversely oriented preferably in such a way that there is an orientation essentially transverse to a parting plane of the mold halves 5, 6, which define the parting plane with their terminal boundaries that face each other in the closed state of the blowing station 3.

If the blowing station 3 is mounted on a rotating blowing wheel 25, the cam track 48 has a tangential component extending relative to the periphery of the blowing wheel 25.

To predetermine positioning motions, the base part 7 is connected by a connecting rod 50 with a positioning lever 51, which is connected with the drive shaft 45. The positioning lever 51 is flexibly connected with both the base part 7 and the positioning lever 51. Besides the engagement of the cam follower 47 in the cam track 48, the base part 7 is guided along another support track, which is not shown in FIG. 5 but will be explained in greater detail later with reference to FIG. 8.

Figure 6:
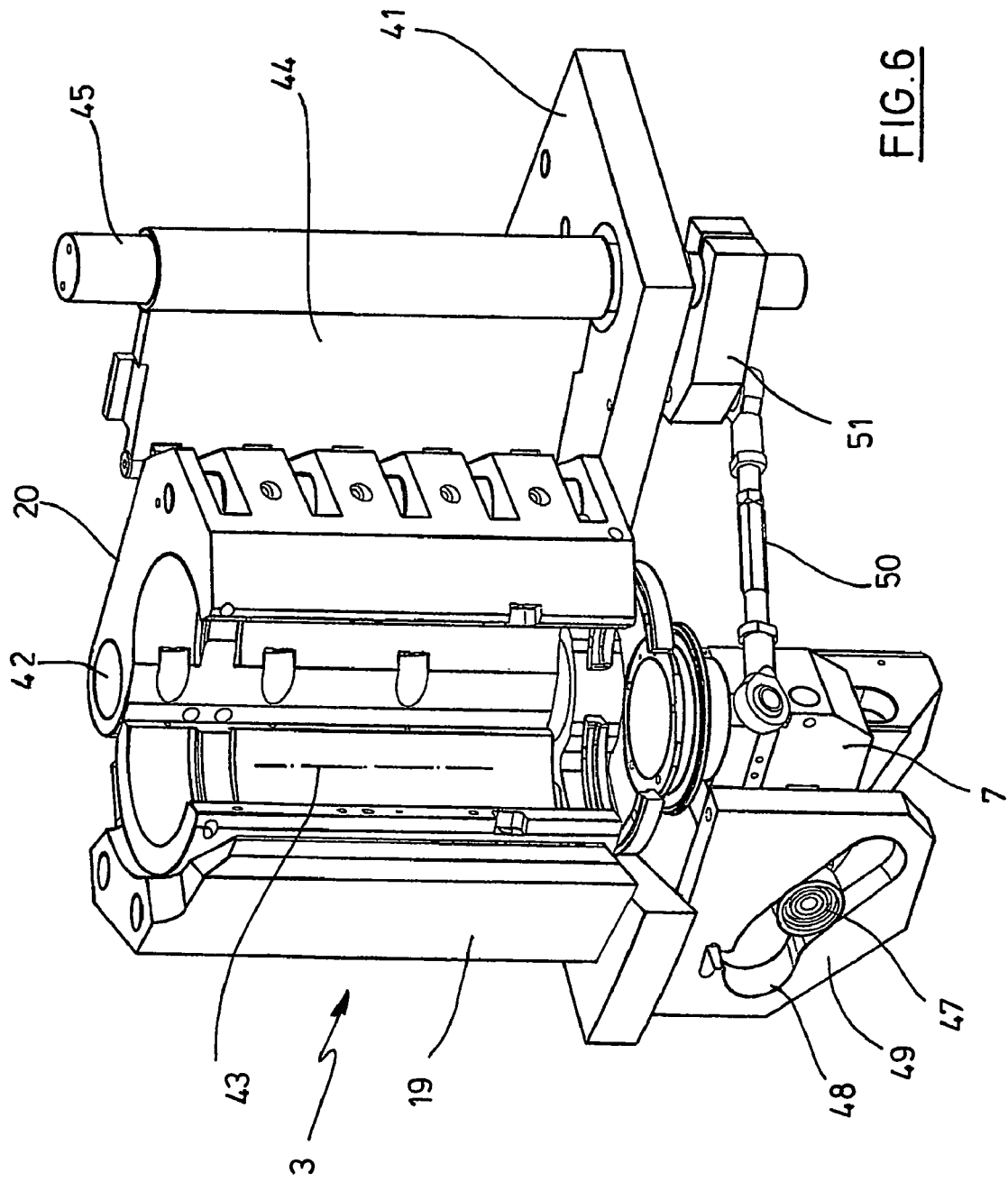
FIG. 6 shows the device according to FIG. 5 after the blowing station has been partially closed.

FIG. 6 shows the blowing station of FIG. 5 with the mold supports 19, 20 in a partially closed position. The closing motion is predetermined by rotation of the drive shaft 45 and the swiveling of the coupling lever 44 that this causes. At the same time, the positioning lever 51 is swiveled. This causes the cam follower 47 of the base part 7 to be pushed by the connecting rod 50 along a section of the cam track 48. This causes the base part 7 to carry out both a movement in the longitudinal direction 43 and a translational movement transversely to the longitudinal direction 43.

Figure 7:
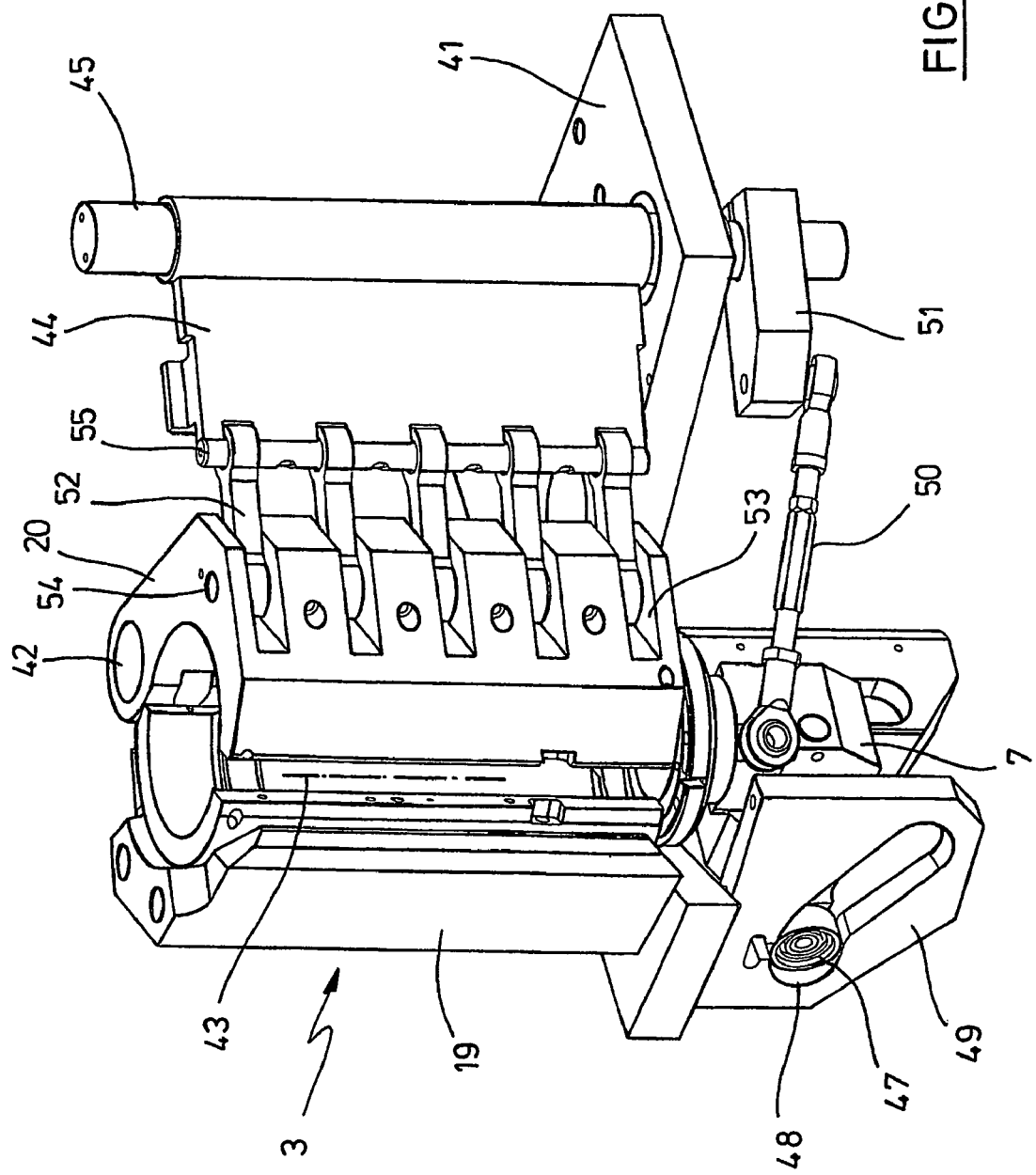
FIG. 7 shows the device according to FIG. 6 just before the blowing station is completely closed.

FIG. 7 shows the blowing station 3 of FIG. 5 and FIG. 6 in an almost completely closed state. Here the base part 7 is already completely positioned in the longitudinal direction 43 and at the end of the movement still has to carry out only a movement transverse to the longitudinal direction 43. This makes it possible to provide a positive-locking connection between the base part 7 and the mold support 19. To support this sequence of movements, the cam track 48 has a short horizontal section that follows the main section of the cam track 48, which runs obliquely to the horizontal.

It is advantageous for the cam follower 47 to be guided in the cam track 48 in a way that allows it to be moved transversely. This makes it possible for the cam support 49 to be realized as a plate by simple production-engineering means, even though the cam follower 47 not only carries out its movement along the cam track 48 but also follows a curved path of motion due to the rotational motion of the positioning lever 51. This can be compensated by transverse mobility of the cam follower 47 in the cam track 48.

The positioning lever 51 is typically dimensioned in such a way that a center axis of the base part 7 that runs parallel to the longitudinal axis 43 passes through half the distance that corresponds to a path of motion of a center line of the swiveling mold support 20 transverse to the longitudinal direction 43. As a result, after an opening movement has been carried out, the base part 7 is situated essentially equidistant from the two mold supports 19, 20 and thus equidistant from the mold halves 5, 6. This makes it possible to remove a blow-molded container 2 with minimal opening of the blowing station 3.

FIG. 7 also shows that to further promote a compact design, the coupling lever 44 is connected with the mold support 20 by transverse links 55, which, in the open state of the blowing station 3, can be sunk in chamber-like recesses 53 of the mold support 20. The transverse links 52 can be rotated about a longitudinal axis 54 of the mold support 20 and about a longitudinal axis 55 of the coupling lever 44. The longitudinal axes 42, 54, 55 run essentially parallel to the longitudinal direction 43.

Figure 8:
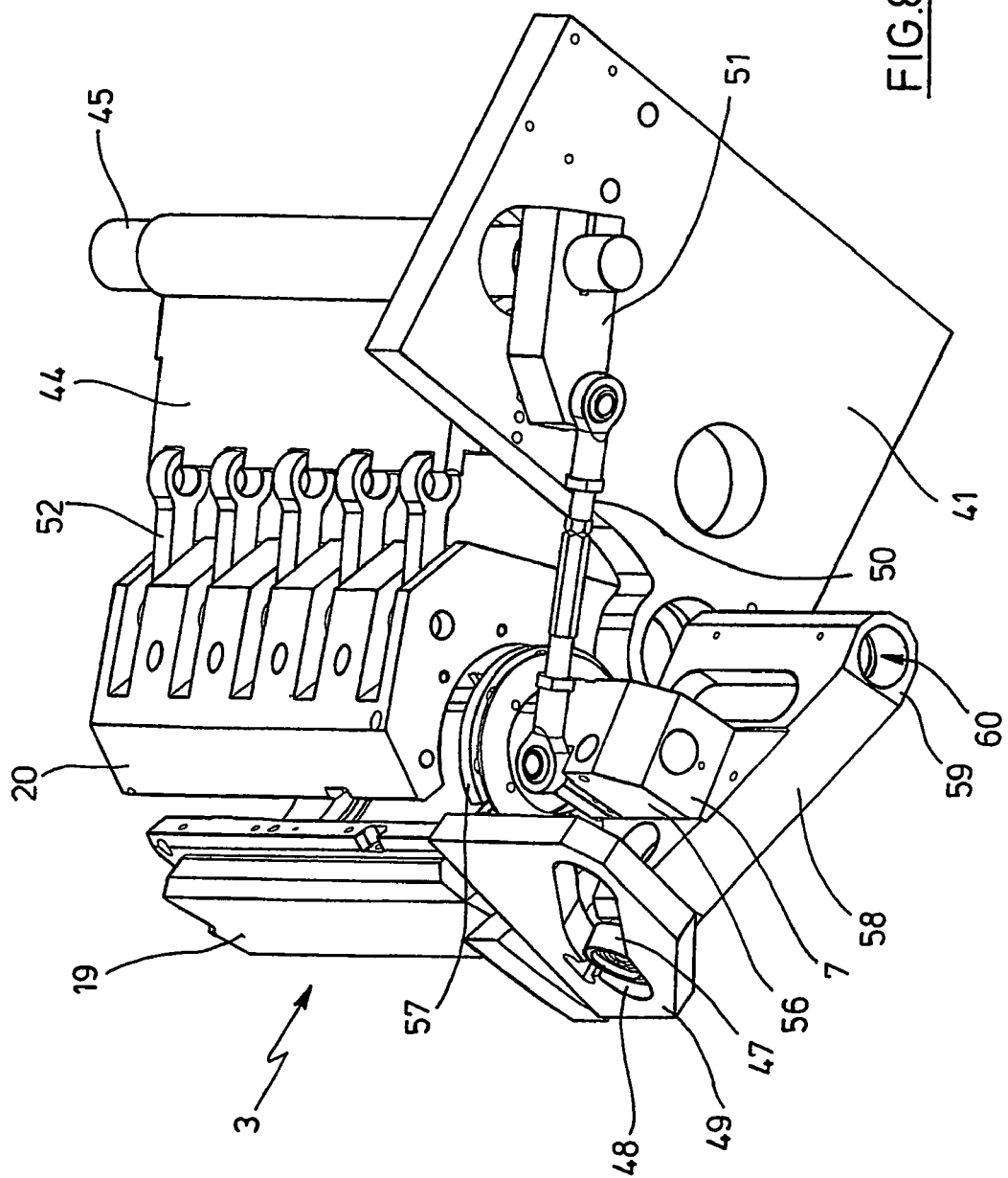
FIG. 8 shows a perspective view of the device according to FIG. 7, as viewed obliquely from below.

FIG. 8 shows the blowing station 3 in a perspective view from below. The drawing reveals especially that the base part 7 consists of a base mold support 56, the base mold 57 itself, and a positioning element 58, on which the cam follower 47 is mounted. The base mold support 56 are the base mold 57 are rigidly connected with each other. In accordance with a preferred embodiment, the base mold support 56 and the positioning element 58 are also rigidly connected with each other.

According to the specific embodiment illustrated in FIG. 8, the positioning element 58 has a guide bush 59, which encloses a guide shaft 60 (not shown). In particular, it is proposed that the guide shaft 60 be arranged as an extension of the blowing station shaft 42 (likewise not shown). The mold support 20 and the positioning element 58 thus swivel about a common axis of rotation.

The sequence of movements of the base mold 7 will now be explained again with reference to FIG. 8. Starting from the operating state in FIG. 8, during an opening movement of the mold support 20, the connecting rod 50 exerts a pulling force on the base part 7, and this causes the positioning element 58 to rotate about the guide shaft 60, while at the same time, the cam follower 47 is positioned along the cam track 48. This causes the base mold 57 to carry out both a rotational movement about the guide shaft 60 and a translational movement. In this regard, the path of motion is similar to the course of the thread of a screw.

The invention claimed is:

1. A device for blow molding containers, which has at least one blowing station mounted on a support structure for blow molding thermoplastic preforms into containers; in which the blowing station is provided with at least two blow mold segments that are supported by mold supports and with a base part; and in which both the mold supports and the base part are arranged in a way that allows them to be mechanically positioned, and the mold supports and the base part are mechanically coupled with one another, wherein one of the mold supports (19, 20) is mounted by the support structure (41) in an immovable way, while the other mold support (19, 20) is mounted by the support structure (41) in a way that allows it to swivel, where the base part (7) is mounted in a way that allows it to move relative to each of the two mold supports (19, 20), and where the base part (7) has a path of motion relative to the mold supports (19, 20) that has both a component that extends in the longitudinal direction (43) of the blowing station (7) and a component that extends perpendicularly to the longitudinal direction (43).

2. A device in accordance with claim 1, wherein the base part (7) can be positioned under cam control.

3. A device in accordance with claim 1, wherein the base part (7) is coupled with the movable mold support (20).

4. A device in accordance with claim 1, wherein the base part (7) is mounted in such a way that it is able to rotate relative to a vertical axis.

5. A device in accordance with claim 1, wherein the axis is an extension of a shaft (42) of the blowing station (3).

6. A device in accordance with claim 1, wherein the base part (7) has a cam follower (47) that engages a cam track (48) that extends essentially tangentially to a path of motion of the swiveling mold support (20).

7. A device in accordance with claim 1, wherein the base part (7) has a path of motion that is located within a segment of a cylindrical cam that is positioned essentially cylindrically with respect to the shaft (42) of the blowing station.

8. A device in accordance with claim 1, wherein the base part (7) is connected with a drive shaft (45) by a connecting rod (50) and a positioning lever (51).

9. A device in accordance with claim 8, wherein ends of the connecting rod (50) are flexibly connected with both the base part (7) and the positioning lever (51).

10. A device in accordance with claim 1, wherein the blowing station is mounted on a blowing wheel (25).

11. A device in accordance with claim 1, wherein the base part (7) can be positioned transversely to a parting plane fixed by the blow mold segments in a closed state of the blowing station.

* * * * *